Aug. 16, 1938.  G. T. BALFE  2,126,716
GASKET
Filed Jan. 9, 1935
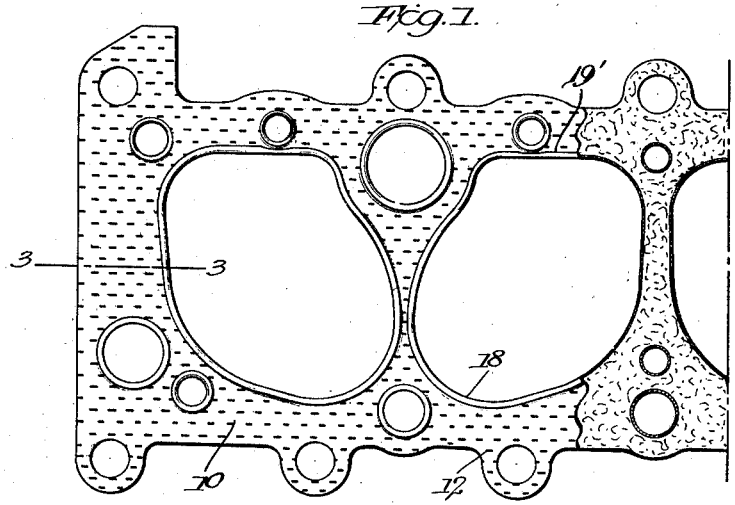
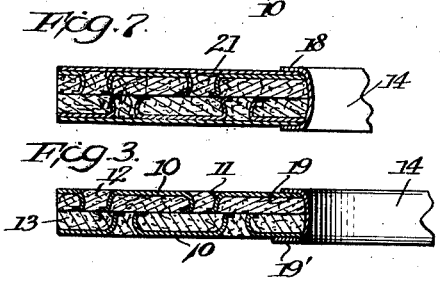
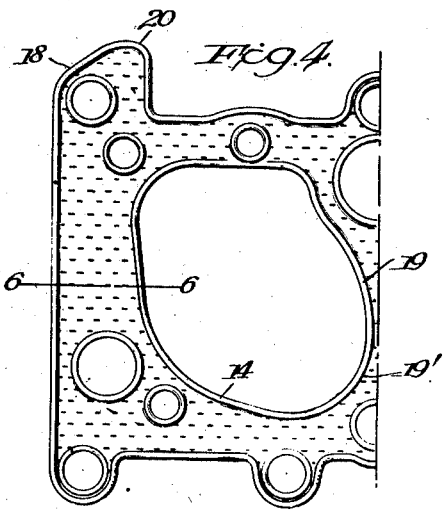
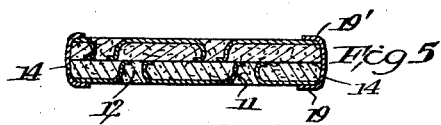
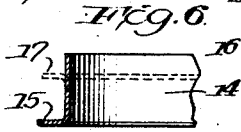
Inventor
George T. Balfe Patented Aug. 16, 1938

2,126,716

UNITED STATES PATENT OFFICE 2,126,716

GASKET

George T. Balfe, Detroit, Mich., assignor to Detroit Gasket & Mfg. Co., Detroit, Mich., a corporation of Michigan Application January 9, 1935, Serial No. 1,062

2 Claims. (Cl. 288—1)

The present invention relates to gaskets and particularly gaskets for automotive engines.

The gasket of this application is of a type which may be called an armored gasket. That is to say, I produce a gasket having (1) metal surfaces, (2) completely sealed edges, and (3) internal barriers substantially throughout its area.

My gasket is compressible and completely resistant to the various disintegrating influences encountered in automotive practice. It is moreover very simple in its make-up and the method of manufacture permits production on a large scale and at relatively small expense.

In the drawing:

Figure 1 is a top elevation of a part of a cylinder head gasket, a portion of the upper metallic surface being removed to show the cushion insulating material.

Figure 2 is a side elevation of the gasket shown in Figure 1.

Figure 3 is a sectional view taken through the gasket.

Figure 4 is a top elevation similar to Figure 1 of a modified form of gasket wherein both the walls of the openings in the gasket and the gasket edge per se are completely sealed.

Figure 5 is a sectional view of the gasket shown in Figure 4.

Figure 6 is a detailed view partly broken away of one of the gromets or means for armoring the gasket, and Figure 7 is a sectional view of a modified form of gasket.

The gasket shown in Figure 1 comprises metal surface layers 10 which are provided with a multiplicity of closely spaced inwardly extending projections or barriers 11. The striking up of the metal produces a sheet having a plurality of openings 12 therein. It is to be observed that the projections are struck up substantially throughout the entire area of the sheet.

In the preferred construction, as shown in Figure 3, a sheet of cushion insulating material 13, such as asbestos or compressed asbestos, is compressed upon one side of the metal layer 10, and the projections 11 thereof are embedded within the cushion insulating layer. Preferably, the projections extend to the surface of the cushion insulating layer, but not thereabove and have their ends bent or clenched over to lie within the plane of the surface of the insulating layer. It is preferred that the ends of the projections not extend above the surface of the cushion layers so as not to interfere with a substantially smooth surface being formed. However, in some cases, the ends of the projections extend above the surfaces of the cushion layers, and in the assembled gasket, may extend into the respective adjacent superposed cushion layers.

A plurality of the layers 10—13 are thereupon superposed, as in Figure 3, for example, with the metal surfaces 10 disposed outwardly, i. e., the metal layers 10 form the armored surfaces of the gasket and the cushion layers, with barriers 11 embedded therein, a core.

The projections 11 are preferably struck up along straight lines, the projections in one line being staggered with relation to the projections in the next adjacent line. When the composite layers are assembled as shown in Figure 3, the projections of one of the metal layers are in staggered relation with the projections of the opposite metal layer. This increases materially the barrier effect, i. e., resistance to blowing, which has heretofore resulted due to the high pressure and high temperatures encountered.

In order to seal the edges of the openings in the gasket, I utilize a gromet illustrated in detail in Figure 6. This gromet has a body portion 14 and a flange 15 integral therewith, and the gromet is inserted through an opening to be armored, whereupon the upper edge portion 16 is bent over as shown in dotted lines at 17 in Figure 6 and in full lines at 18 in Figure 1. The flanges 15, 17 thus formed are compressed upon the metal surface layers 10. The edges of the gromet, as shown in Figure 3, embrace the marginal portions of the surfaces of the gasket on opposite sides thereof, as shown at 19. These marginal portions 19 may extend above the plane of the layers 10, but are preferably compressed so that the gasket presents a substantially plane and smooth surface. That is, the top surface of the marginal portion 19' of the gromet will be substantially flush with the adjacent top surface of the layer 10 by reason of the compression to which it is subjected.

In Figure 4, the gromet is not only applied to the openings in the gasket as heretofore described, but the external edge portion 20 is likewise sealed. The gromet applied to the edge portion may be continuous or in sections, and is in all respects substantially similar to the gromet 14 illustrated in Figure 6.

It will be understood that the gromet 14 may be applied to the interior openings of the gasket or to the exposed external edge thereof or both, to partially or entirely armor the internal or external exposed edge portions of any of the several gaskets shown and described in this application. As will be appreciated, the cushion layers 13 and the metal layers 10 are substantially coextensive.

Referring to Figure 7, I superpose upon one or both sides of any of the gaskets described a layer 21 of preferably plain metal substantially coextensive with the surface metal layers, or of slightly less area than said layers. The gromets 14 will be positioned, as heretofore described above, about the internal or external exposed edge portions, or both, and will engage and be compressed upon the marginal portions 19 of the superposed gasket layers, as shown.

If desired, I incorporate the structure herein illustrated with a core consisting of a layer of metal insert material having projections formed from opposite sides thereof and layers of cushion insulating material compressed thereon, all as illustrated in my United States Patent No. 1,776,140. Such steel asbestos core will take the place of the cushion sealing material-metal layers 10—13 or layer 13, and metal layer 10 or plain layers 21 or both will be disposed on one or both sides thereof, as in Figure 7, or if desired, a layer of the composite structure 10—13 is disposed upon opposite sides of the metal-asbestos core structure shown in my aforesaid patent with the metal or asbestos of such layer 10—13 exposed. Such built-up gaskets are, in some cases, provided with the gromets 14 as described and as stated, additional metal layers 10 or layers 21 are employed as in connection with Figure 7.

It is to be noted that the gromets 14 act as connecting means independent of the projections for the built-up gasket structures shown and described in addition to sealing and strengthening the gasket at the edge portions. The gromets also act as spacing and guiding means for the gasket. The gromets are flexible and resilient so that they can readily compensate for any inequalities which the application of the gasket may produce.

This application is a continuation-in-part of my applications Serial No. 482,098, filed September 15, 1930, now Patent No. 2,029,302, issued February 4, 1936, and Serial No. 690,739, filed September 23, 1933, now Patent No. 2,084,054, issued June 15, 1937, and the projections 13 may have the form shown in my United States Patent No. 1,776,140, or as illustrated in my United States Patent No. 1,927,450.

The metal layers 10 and 21 are formed of steel of suitably thin gauge, and the gromets 14 are likewise preferably formed of thin gauge steel. The metal is resilient and flexible and the gasket is resilient, but possesses the desired rigidity for all sealing purposes.

The gromets for the edges of the gasket openings, as well as for the exposed external edge of the gasket, are flexible and resilient and will therefore compensate for irregularities when the gasket is fixed between joint surfaces. While the barrier projections 11 normally prevent any shifting of the metal layers with respect to the cushion layers or with respect to each other, there are occasions when the pressures and temperatures and surface unevenness will tend to occasion slight distortion. This will be resisted by the gromets in cooperation with the barriers and any slight deviation taken up by the gromets, so that smooth continuous walls will be presented at the gasket openings, which is important in that any possibility of disruption or disintegration is effectively provided against.

The metal layers 10 or 21 may be constructed with integral gromet portions displacing in whole or in part the separate gromets 14 by extending the metal thereof at the openings or peripheral edges so as to embrace the edge portions of the gasket as shown in Figures 1, 3, 4 and 7.

When the gaskets shown in the several figures are applied between joint surfaces and compressed, the asbestos 13 is forced into and fills the openings 12, or the gaskets, as manufactured, have the cushion material 13 disposed in and compacted in said perforations 12, as shown in Figures 1, 3, 4, 5 and 7, forming a smooth sealed surface. Preferably the cushion material, in the article as formed, is compressed into the protuberances and openings to fill the same and this affords a very effective seal, since under compression between joint surfaces the cushion material not only fills the openings 12 in the metal layer 10 but is further compacted, resulting in an enhanced seal.

The gasket, as stated, is compressible and the cushion insulating material is assisted in its action of compression and return by the resilient projections 11 as well as the metal layers.

Various modifications may be made, all of which are comprehended in the appended claims.

I claim:—

1. A gasket having a service opening therethrough and comprising two independently preformed composite layers, each layer being formed by a lamina of compressed cushion material and a lamina of sheet metal at least coextensive therewith and comprising a multiplicity of closely spaced projections extending substantially through the thickness of the cushion lamina to clinch the latter and being confined to said lamina, the projections being struck from the sheet metal layer and forming perforations therein through which the cushion material is exposed, the said composite layers being coextensive and being arranged in face to face relation with the metal laminae exposed at the gasket surfaces, the multiplicity of perforations in each metal lamina providing metal surfaces readily conformable under pressure to the surfaces being sealed and the perforations therein permitting the cushion material to be brought to the gasket surfaces at a multiplicity of closely spaced points and to contact with the surfaces to be sealed when the gasket is subjected to pressure, and means independent of the projections connecting the composite layers.

2. A gasket having a service opening therethrough and comprising two independently preformed composite layers, each layer being formed by a lamina of compressed cushion material and a lamina of sheet metal at least coextensive therewith and comprising a multiplicity of closely spaced projections extending substantially through the thickness of the cushion lamina to clinch the latter and being confined to said lamina, the projections being struck from the sheet metal layer and forming perforations therein through which the cushion material is exposed, the said composite layers being coextensive and being arranged in face to face relation with the metal laminae exposed at the gasket surfaces, the multiplicity of perforations in each metal lamina providing metal surfaces readily conformable under pressure to the surfaces being sealed and the perforations therein permitting the cushion material to be brought to the gasket surfaces at a multiplicity of closely spaced points and to contact with the surfaces to be sealed when the gasket is subjected to pressure, and gromets serving as means independent of the projections for connecting the composite layers while retaining the aforesaid surface characteristics of the gasket.

GEORGE T. BALFE.